United States Patent
Jin et al.

(10) Patent No.: US 10,674,421 B2
(45) Date of Patent: Jun. 2, 2020

(54) DATA PACKET PROCESSING METHOD AND DEVICE

(71) Applicant: HUAWEI TECHNOLOGIES CO., LTD., Shenzhen, Guangdong (CN)

(72) Inventors: Heng Jin, Shenzhen (CN); Wei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 16/131,543

(22) Filed: Sep. 14, 2018

(65) Prior Publication Data
US 2019/0014525 A1     Jan. 10, 2019

Related U.S. Application Data
(63) Continuation of application No. PCT/CN2016/076361, filed on Mar. 15, 2016.

(51) Int. Cl.
H04W 4/00      (2018.01)
H04W 40/04     (2009.01)
(Continued)

(52) U.S. Cl.
CPC .......... *H04W 40/04* (2013.01); *H04W 8/082* (2013.01); *H04W 8/22* (2013.01); *H04W 28/0289* (2013.01); *H04W 48/18* (2013.01)

(58) Field of Classification Search
None
See application file for complete search history.

(56) References Cited

U.S. PATENT DOCUMENTS
2012/0057550 A1    3/2012  Zhao et al.
2013/0242733 A1    9/2013  Guo et al.
(Continued)

FOREIGN PATENT DOCUMENTS
CN    102916867 A    2/2013
CN    103067337 A    4/2013
(Continued)

OTHER PUBLICATIONS
XP051092172, 3GPP TS 23.682 V13.5.0 (Mar. 2016), "3rd Generation Partnership Project; Technical Specification Group Services and System Aspects; Architecture enhancements to facilitate communications with packet data networks and applications (Release 13)," pp. 1-90.
(Continued)

*Primary Examiner* — Clemence S Han
(74) *Attorney, Agent, or Firm* — Kilpatrick Townsend & Stockton LLP

(57) ABSTRACT

The present invention discloses a data packet processing method and a device. The method includes: receiving, by a capability exposure function device, a first processing policy sent by a third-party application, where the first processing policy includes an external identifier of UE, an identifier of the third-party application, and a processing policy of a data packet sent by the UE to the third-party application; obtaining an internal identifier of the UE based on the external identifier of the UE; determining a second processing policy based on the internal identifier of the UE, where the second processing policy includes the internal identifier of the UE, the identifier of the third-party application, and the processing policy of the data packet; and configuring the second processing policy on a network side, where the second processing policy is used by a network side device to process the data packet.

20 Claims, 8 Drawing Sheets

(51) Int. Cl.
*H04W 8/22* (2009.01)
*H04W 8/08* (2009.01)
*H04W 48/18* (2009.01)
*H04W 28/02* (2009.01)

(56) References Cited

U.S. PATENT DOCUMENTS

| | | | |
|---|---|---|---|
| 2015/0304939 A1 | 10/2015 | Liu et al. | |
| 2016/0135143 A1* | 5/2016 | Won | H04W 72/005 370/312 |
| 2018/0152526 A1* | 5/2018 | Xie | H04W 4/50 |
| 2018/0323982 A1* | 11/2018 | Lu | H04W 4/24 |
| 2018/0332462 A1* | 11/2018 | Kim | H04W 4/70 |
| 2019/0028337 A1* | 1/2019 | Ryu | H04W 8/20 |
| 2019/0028866 A1* | 1/2019 | Baek | H04W 4/50 |

FOREIGN PATENT DOCUMENTS

| | | |
|---|---|---|
| CN | 103392353 A | 11/2013 |
| EP | 2938131 A1 | 10/2015 |
| WO | 2009062392 A1 | 5/2009 |
| WO | 2015180185 A1 | 12/2015 |

OTHER PUBLICATIONS

Extended European Search Report, dated Nov. 26, 2018, in European Application No. 16893871.0 (13 pp.).
International Search Report, dated Dec. 6, 2016, in International Application No. PCT/CN2016/076361 (4 pp.).
Written Opinion of the International Searching Authority, dated Dec. 6, 2016, in International Application No. PCT/CN2016/076361 (7 pp.).

* cited by examiner

300

A network side device obtains a data packet sent by UE to a third-party application, where the data packet includes an internal identifier of the UE and an identifier of the third-party application, and the internal identifier of the UE is an identifier for identifying the UE by a network side ⸺ S310

The network side device queries a second processing policy based on the internal identifier of the UE and the identifier of the third-party application, to obtain a processing policy of the data packet, where the second processing policy includes the internal identifier of the UE, the identifier of the third-party application, and the processing policy of the data packet; the second processing policy is obtained by a capability exposure function device based on a first processing policy of the third-party application and is configured on the network side; the first processing policy includes an external identifier of the UE, the identifier of the third-party application, and the processing policy of the data packet; and the external identifier of the UE is an identifier for identifying the UE by the third-party application ⸺ S320

The network side device processes the data packet according to the processing policy of the data packet ⸺ S330

FIG. 3

DATA PACKET PROCESSING METHOD AND DEVICE

CROSS-REFERENCE TO RELATED APPLICATIONS

This application is a continuation of International Application No. PCT/CN2016/076361, filed on Mar. 15, 2016, the disclosure of which is hereby incorporated by reference in its entirety.

TECHNICAL FIELD

The present invention relates to the communications field, and more specifically, to a data packet processing method and a device.

BACKGROUND

After user equipment (User Equipment, UE) accesses an evolved packet system (Evolved Packet System, EPS), a packet data network (Packet Data Network, PDN) gateway (PDN Gateway, PGW) allocates an Internet Protocol (Internet Protocol, IP) address to the UE, and the UE implements data transmission with an external network by using the IP address. All uplink data packets of the UE are sent to the external network by using the PGW, and all downlink data packets of the external network are sent to the UE by using the PGW.

For a data packet of an Internet application (Over The Top, OTT), processing the data packet by an access network side may optimize a service of OTT. However, the access network side currently cannot determine which data packet needs to be processed. In addition, a mobile edge computing (Mobile Edge Computing, MEC) platform currently cannot determine a data packet on which local routing is performed, either.

Therefore, a data packet processing policy is needed, to process a data packet according to the policy.

SUMMARY

Embodiments of the present invention provide a data packet processing method and a device, so that a data packet can be processed according to a policy.

According to a first aspect, a data packet processing method is provided, including:

receiving, by a capability exposure function device, a first processing policy sent by a third-party application, where the first processing policy includes an external identifier of user equipment UE, an identifier of the third-party application, and a processing policy of a data packet sent by the UE to the third-party application; and the external identifier of the UE is an identifier for identifying the UE by the third-party application;

obtaining, by the capability exposure function device, an internal identifier of the UE based on the external identifier of the UE, where the internal identifier of the UE is an identifier for identifying the UE by a network side;

determining, by the capability exposure function device, a second processing policy based on the internal identifier of the UE, where the second processing policy includes the internal identifier of the UE, the identifier of the third-party application, and the processing policy of the data packet; and configuring, by the capability exposure function device, the second processing policy on the network side, where the second processing policy is used by a network side device to process the data packet.

According to the data packet processing method in this embodiment of the present invention, the second processing policy is configured on the network side based on the first processing policy sent by the third-party application, so that the data packet of the third-party application can be processed according to the policy, thereby improving transmission efficiency of the data packet of the third-party application.

In some possible implementations, the configuring, by the capability exposure function device, the second processing policy on the network side includes:

sending, by the capability exposure function device, the second processing policy to a database of the network side, where the database is used by a base station to query the second processing policy, and the second processing policy is used by the base station to process the data packet.

The base station processes the data packet according to the processing policy of the data packet. For example, access network status information is added to the data packet, and then the data packet is sent to the third-party application. The third-party application may perform corresponding processing based on the information. In this way, a load variation of an access network side can be adapted to in real time, thereby improving user experience.

In some possible implementations, the configuring, by the capability exposure function device, the second processing policy on the network side includes:

sending, by the capability exposure function device, the second processing policy to a mobile edge computing platform, where the second processing policy is used by the mobile edge computing platform to process the data packet.

The mobile edge computing platform performs local routing on the data packet according to the processing policy of the data packet. In this way, the data packet may be directly routed to the third-party application, and is no longer sent to the third-party application by using a core network.

In some possible implementations, the configuring, by the capability exposure function device, the second processing policy on the network side includes:

sending, by the capability exposure function device, the second processing policy to a radio access network congestion awareness function device, so that the radio access network congestion awareness function device sends the second processing policy to a base station, where the second processing policy is used by the base station to process the data packet.

In some possible implementations, the method further includes:

obtaining, by the capability exposure function device, an identifier of the base station based on the external identifier of the UE; and sending, by the capability exposure function device, the identifier of the base station to the radio access network congestion awareness function device.

In some possible implementations, the external identifier of the UE is a public Internet Protocol IP address, a phone number, or an account name of the UE; and the internal identifier of the UE is a internal IP address or a tunnel identifier tunnel ID of the UE.

Optionally, when the external identifier of the UE is the public IP address of the UE, the capability exposure function device requests the internal IP address of the UE from a PGW.

Optionally, when the external identifier of the UE is another external identifier different from the public IP address of the UE, the capability exposure function device first requests an IMSI/MSISDN of the UE from an HSS, and then requests the internal IP address of the UE from a PGW.

Optionally, the capability exposure function device first sends a subscription request to an HSS, to request an IMSI/MSISDN of the UE and a destination MME address, and then sends a request to an MME, to request the tunnel ID of the UE.

In some possible implementations, the method further includes:

obtaining, by the capability exposure function device, an updated internal identifier of the UE and the non-updated internal identifier of the UE; and updating and configuring, by the capability exposure function device, the second processing policy on the network side based on the updated internal identifier of the UE and the non-updated internal identifier of the UE.

According to a second aspect, a data packet processing method is provided, including:

obtaining, by a network side device, a data packet sent by user equipment UE to a third-party application, where the data packet includes an internal identifier of the UE and an identifier of the third-party application, and the internal identifier of the UE is an identifier for identifying the UE by a network side;

querying, by the network side device, a second processing policy based on the internal identifier of the UE and the identifier of the third-party application, to obtain a processing policy of the data packet, where the second processing policy includes the internal identifier of the UE, the identifier of the third-party application, and the processing policy of the data packet; the second processing policy is obtained by a capability exposure function device based on a first processing policy of the third-party application and is configured on the network side; the first processing policy includes an external identifier of the UE, the identifier of the third-party application, and the processing policy of the data packet; and the external identifier of the UE is an identifier for identifying the UE by the third-party application; and processing, by the network side device, the data packet according to the processing policy of the data packet.

According to the data packet processing method in this embodiment of the present invention, the data packet is processed according to the configured second processing policy, so that the data packet of the third-party application can be processed according to the policy, thereby improving transmission efficiency of the data packet of the third-party application.

In some possible implementations, the network side device is a base station; and the processing, by the network side device, the data packet according to the processing policy of the data packet includes:

adding, by the base station, access network status information to the data packet according to the processing policy of the data packet, and sending the data packet to the third-party application.

In some possible implementations, the querying, by the network side device, a second processing policy based on the internal identifier of the UE and the identifier of the third-party application, to obtain a processing policy of the data packet includes:

querying, by the base station, the second processing policy in a database of the network side based on the internal identifier of the UE and the identifier of the third-party application, to obtain the processing policy of the data packet, where the second processing policy is sent by the capability exposure function device to the database.

In some possible implementations, the method further includes:

receiving, by the base station, the second processing policy sent by a radio access network congestion awareness function device, where the second processing policy is sent by the capability exposure function device to the radio access network congestion awareness function device; and the querying, by the network side device, a second processing policy based on the internal identifier of the UE and the identifier of the third-party application, to obtain a processing policy of the data packet includes:

querying, by the base station, the second processing policy in the base station based on the internal identifier of the UE and the identifier of the third-party application, to obtain the processing policy of the data packet.

In some possible implementations, the method further includes:

receiving, by the base station, an updated internal identifier of the UE and the non-updated internal identifier of the UE that are sent by the radio access network congestion awareness function device, where the updated internal identifier of the UE and the non-updated internal identifier of the UE are sent by the capability exposure function device to the radio access network congestion awareness function device; and updating, by the base station, the second processing policy in the base station based on the updated internal identifier of the UE and the non-updated internal identifier of the UE.

In some possible implementations, the network side device is a mobile edge computing platform; and the processing, by the network side device, the data packet according to the processing policy of the data packet includes:

performing, by the mobile edge computing platform, local routing on the data packet according to the processing policy of the data packet.

In some possible implementations, the method further includes:

receiving, by the mobile edge computing platform, the second processing policy sent by the capability exposure function device; and the querying, by the network side device, a second processing policy based on the internal identifier of the UE and the identifier of the third-party application, to obtain a processing policy of the data packet includes:

querying, by the mobile edge computing platform, the second processing policy in the mobile edge computing platform based on the internal identifier of the UE and the identifier of the third-party application, to obtain the processing policy of the data packet.

In some possible implementations, the method further includes:

receiving, by the mobile edge computing platform, an updated internal identifier of the UE and the non-updated internal identifier of the UE that are sent by the capability exposure function device; and updating, by the mobile edge computing platform, the second processing policy in the mobile edge computing platform based on the updated internal identifier of the UE and the non-updated internal identifier of the UE.

In some possible implementations, the external identifier of the UE is a public Internet Protocol IP address, a phone number, or an account name of the UE; and the internal identifier of the UE is a internal IP address or a tunnel identifier tunnel ID of the UE.

According to a third aspect, a capability exposure function device is provided, including modules for executing the method of the first aspect or any possible implementation of the first aspect.

According to a fourth aspect, a network side device is provided, including modules for executing the method of the second aspect or any possible implementation of the second aspect.

According to a fifth aspect, a capability exposure function device is provided. The capability exposure function device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to execute the method of the first aspect or any possible implementation of the first aspect.

According to a sixth aspect, a network side device is provided. The network side device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to execute the method of the second aspect or any possible implementation of the second aspect.

According to a seventh aspect, a computer readable medium is provided, for storing a computer program, where the computer program includes an instruction for executing the method of the first aspect or any possible implementation of the first aspect.

According to an eighth aspect, a computer readable medium is provided, for storing a computer program, where the computer program includes an instruction for executing the method of the second aspect or any possible implementation of the second aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

FIG. 3 is a schematic flowchart of a data packet processing method according to another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention may be applied to various communications systems, such as: a Global System for Mobile Communications (Global System for Mobile Communications, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS) system, a Long Term Evolution (Long Term Evolution, LTE) system, an LTE frequency division duplex (Frequency Division Duplex, FDD) system, an LTE time division duplex (Time Division Duplex, TDD) system, a Universal Mobile Telecommunications System (Universal Mobile Telecommunications System, UMTS), and a Worldwide Interoperability for Microwave Access (Worldwide Interoperability for Microwave Access, WiMAX) communications system.

It should also be understood that, in the embodiments of the present invention, user equipment (User Equipment, UE) may be referred to as a terminal (Terminal), a mobile station (Mobile Station, MS), a mobile terminal (Mobile Terminal), or the like. The user equipment may communicate with one or more core networks through a radio access network (Radio Access Network, RAN). For example, the user equipment may be a mobile phone (also referred to as a "cellular phone") or a computer with a mobile terminal. For example, the user equipment may also be a portable, pocket-sized, handheld, computer built-in, or in-vehicle mobile apparatus, which exchanges voice and/or data with the radio access network.

In the embodiments of the present invention, a base station may be a base transceiver station (Base Transceiver Station, BTS) in GSM or CDMA, may be a NodeB (NodeB, NB) in WCDMA, or may be an evolved NodeB (Evolved Node B, eNB or eNodeB) in LTE. This is not limited in the present invention. However, for ease of description, the following embodiments are described by using a base station eNB and user equipment UE as an example.

Figure 1:
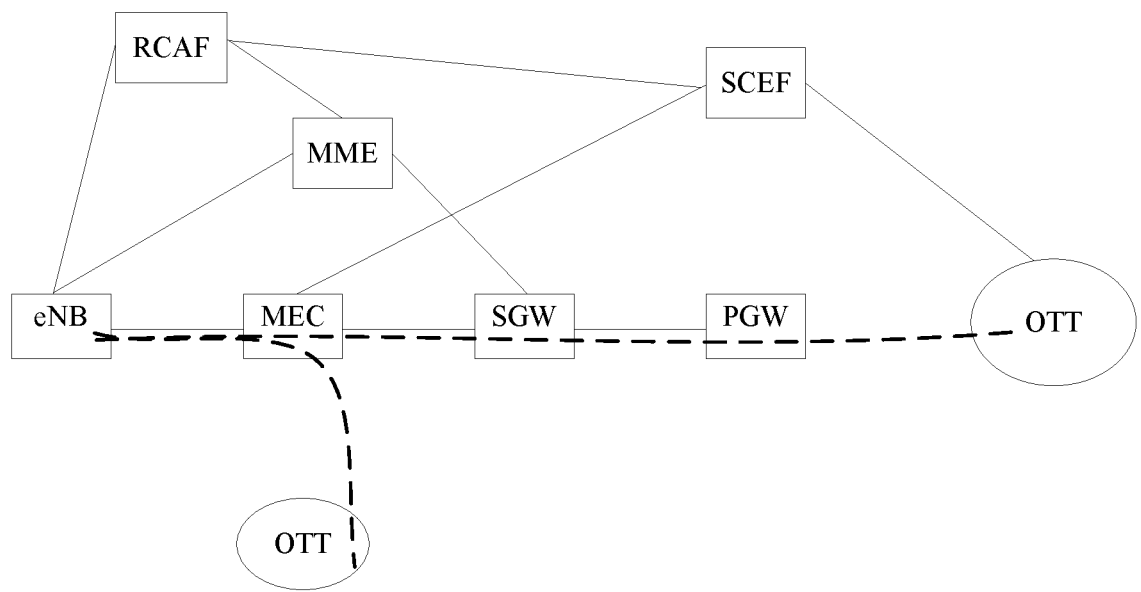
FIG. 1 is a schematic diagram of a network architecture to which the technical solutions in the embodiments of the present invention can be applied.

FIG. 1 is a schematic diagram of a network architecture to which the technical solutions in the embodiments of the present invention can be applied. As shown in FIG. 1, the network architecture may include network elements such as an eNB, a mobility management entity (Mobility Management Entity, MME), a serving gateway (Serving Gateway, SGW), a PGW, a radio access network congestion awareness function (RAN Congestion Awareness Function, RCAF) device, a service capability exposure function (Service Capability Exposure Function, SCEF) device, an MEC device, an OTT, and the like.

The eNB forms an evolved UMTS terrestrial radio access network (Evolved-UTRAN, E-UTRAN), and implements a wireless physical layer function, resource scheduling and radio resource management, radio access control, and a mobility management function. The eNB is connected to the SGW by using a user plane interface S1-U, and is configured to transfer user data; and is connected to the MME by using a control plane interface S1-MME, and implements, by using an S1-AP protocol, a function such as radio access bearer control.

The MME is mainly responsible for all control plane functions of user and session management, including non access stratum (Non Access Stratum, NAS) signaling and security, tracking area list (Tracking Area List) management, PGW and SGW selection, and the like.

The SGW is mainly responsible for transmitting and forwarding data of UE and route switching, and serves as a local mobility anchoring point when the UE performs handover between eNodeBs.

The PGW is an entrance to sending data to the UE by an external network, and is responsible for allocating an IP address of the UE, filtering data packets of the UE, rate control, and generating charging information, and the like.

The SCEF provides an exposed service and function by using a 3GPP network interface, and provides an implementation approach of a service capability exposure function. The SCEF provides a third-party application, such as an OTT, with a function of accessing a network. The SCEF provides a service by using a 3GPP underlying network interface and protocol, and is always in a trusted domain. An application program may be in the trusted domain, or outside the trusted domain. Functions provided by the SCEF include user authentication, archive management, access control table management, policy execution, and the like.

The RCAF is a radio access network congestion awareness function. The network element collects and processes cell congestion information of a radio network side by using operation, administration and maintenance (Operation, Administration and Maintenance, OAM); and obtains, from an MME/serving GPRS support node (Serving GPRS Support Node, SGSN) through an Nq/Nq' interface, identifier information of a user in a congested cell and access point name (Access Point Name, APN) information of the user, and then reports, to a corresponding policy and charging rules function (Policy and Charging Rules Function, PCRF) based on an identifier of the user and the APN information of the user, that an access network side of the UE is in a user plane congestion state.

The MEC is a device close to an access network device, can obtain a data packet of the UE, and perform routing after finishing processing the data packet. When the third-party application is also deployed in a position close to an access network, for example, is deployed on an MEC device, the MEC device can locally route the data packet of the UE to a corresponding third-party application server, and perform local processing.

The OTT is an application that provides various application services for a user by using the Internet. This application is different from a communication service provided by a current operator. The OTT uses only a network of the operator, and a service is provided by a third party other than the operator.

To optimize a service of the OTT, an access network side (eNB) may process a data packet, for example, add access network status information to the data packet, so that the OTT uses the access network status information to perform congestion control. However, the access network side currently cannot determine which data packet needs to be processed. In addition, the MEC currently cannot determine a data packet on which local routing is performed, either. The technical solutions in the embodiments of the present invention provide a data packet processing policy for the eNB and the MEC, and can resolve the foregoing problem.

Figure 2:
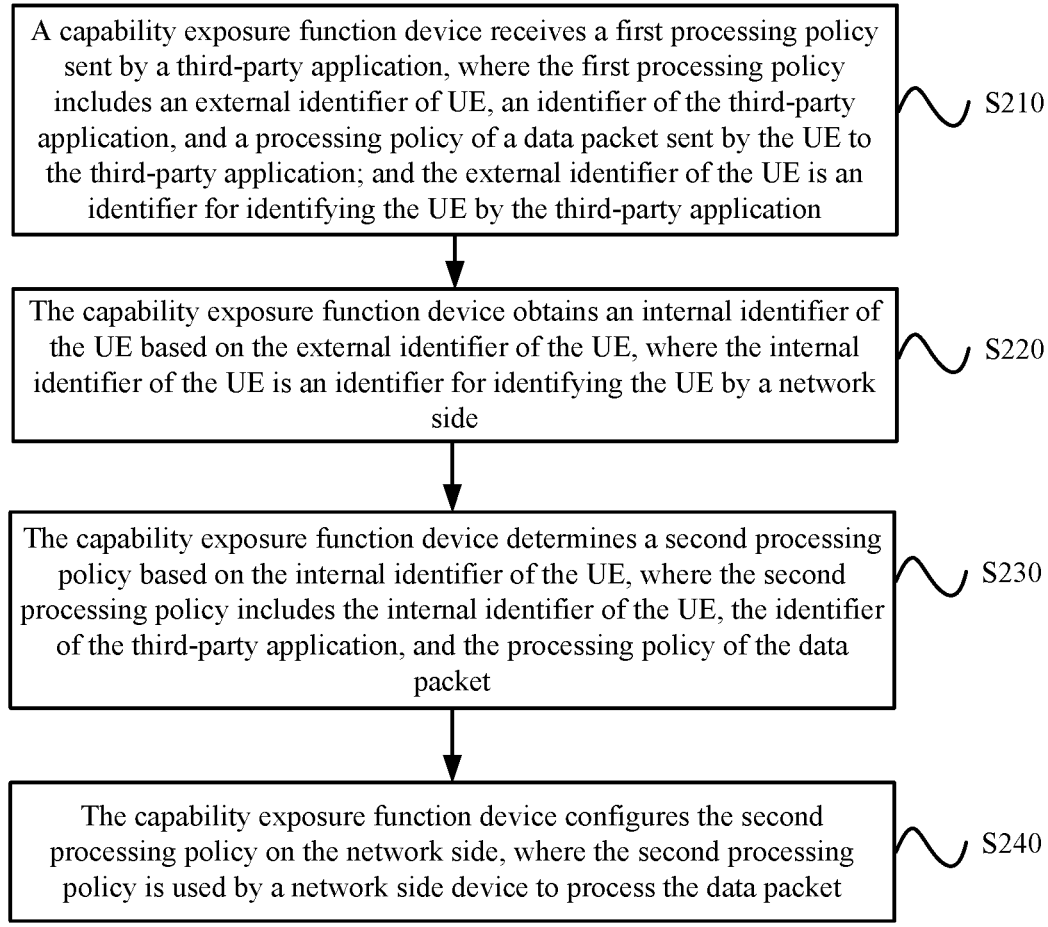
FIG. 2 is a schematic flowchart of a data packet processing method according to an embodiment of the present invention.

FIG. 2 is a schematic flowchart of a data packet processing method 200 according to an embodiment of the present invention. The method 200 is executed by a capability exposure function device. The capability exposure function device may be the SCEF in FIG. 1, or a capability exposure function in an MEC.

S210. The capability exposure function device receives a first processing policy sent by a third-party application, where the first processing policy includes an external identifier of UE, an identifier of the third-party application, and a processing policy of a data packet sent by the UE to the third-party application; and the external identifier of the UE is an identifier for identifying the UE by the third-party application.

The third-party application, such as an OTT, sends the first processing policy to the capability exposure function device. The first processing policy may be determined by the third-party application. The first processing policy includes the external identifier of the UE, the identifier of the third-party application, and the processing policy of the data packet sent by the UE to the third-party application. The external identifier of the UE is the identifier for identifying the UE by the third-party application. In other words, the third-party application sets a processing policy of a data packet for each UE. The processing policy of the data packet indicates whether to process the data packet. For example, a first processing policy for a data packet sent by UE1 to an OTT1 may be "an external identifier of the UE1, an identifier of the OTT1, yes", and the first processing policy indicates that the data packet sent by the UE1 to the OTT1 is to be processed.

It should be understood that the processing policy of the data packet may also be omitted. For example, the first processing policy for the data packet sent by the UE1 to the OTT1 may be "an external identifier of the UE1, an identifier of the OTT1", and the first processing policy indicates that the data packet sent by the UE1 to the OTT1 is to be processed. In other words, if there are corresponding identifiers in the first processing policy, the data packet needs to be processed.

The external identifier of the UE is the identifier for identifying the UE by the third-party application. Optionally, the external identifier of the UE may be an IP address, a phone number, or an account name of the UE.

S220. The capability exposure function device obtains an internal identifier of the UE based on the external identifier of the UE, where the internal identifier of the UE is an identifier for identifying the UE by a network side.

Because the first processing policy sent by the third-party application includes the external identifier of the UE, the external identifier of the UE needs to be converted into the internal identifier for identifying the UE by the network side.

The internal identifier of the UE is the identifier for identifying the UE by the network side. Optionally, the internal identifier of the UE is a internal IP address or a tunnel identifier (tunnel ID) of the UE.

Optionally, in an embodiment of the present invention, when the external identifier of the UE is the public IP address of the UE, the capability exposure function device sends a request to a PGW, to request the internal IP address of the UE, where the request includes the public IP address of the UE. The PGW determines the internal IP address of the UE based on the public IP address of the UE, and sends the internal IP address of the UE to the capability exposure function device.

Optionally, in another embodiment of the present invention, when the external identifier of the UE is another external identifier different from the public IP address of the UE, for example, is the phone number or the account name, the capability exposure function device first sends a request to a home subscriber server (Home Subscriber Server, HSS), to request an international mobile subscriber identity (International Mobile Subscriber Identity, IMSI)/mobile station international ISDN number (Mobile Station international ISDN number, MSISDN) of the UE, where the request includes the external identifier of the UE. The HSS sends, to the capability exposure function device, the IMSI/MSISDN of the UE corresponding to the external identifier of the UE. Then, the capability exposure function device sends a request to a PGW, to request the internal IP address of the UE, where the request includes the IMSI/MSISDN of the UE. The PGW determines the internal IP address of the UE based on the IMSI/MSISDN of the UE, and sends the internal IP address of the UE to the capability exposure function device.

Optionally, in another embodiment of the present invention, the capability exposure function device first sends a subscription request to an HSS, where the request includes the external identifier of the UE. The HSS sends a request response to the capability exposure function device, where the response includes an IMSI/MSISDN of the UE and a destination MME address (address). The capability exposure function device then sends a request to an MME, to request tunnel ID information of the UE, where the request includes the IMSI/MSISDN of the UE. The MME sends a request response to the capability exposure function device, where the request response includes the tunnel ID information of the UE, such as an eNB address/eNB TEID or an SGW TEID. Alternatively, the capability exposure function device may also request the tunnel ID information from an SGW, and the SGW returns an eNB address or an eNB TEID/SGW TEID to the capability exposure function device.

S230. The capability exposure function device determines a second processing policy based on the internal identifier of the UE, where the second processing policy includes the internal identifier of the UE, the identifier of the third-party application, and the processing policy of the data packet.

After obtaining the internal identifier of the UE, the capability exposure function device converts the first processing policy into the second processing policy, where the second processing policy includes the internal identifier of the UE, the identifier of the third-party application, and the processing policy of the data packet. For example, a second processing policy for the data packet sent by the UE1 to the OTT1 may be "an internal identifier of the UE1, an identifier of the OTT1, yes", and the second processing policy indicates that the data packet sent by the UE1 to the OTT1 is to be processed.

It should be understood that the processing policy of the data packet may also be omitted. For example, the second processing policy for the data packet sent by the UE1 to the OTT1 may be "an internal identifier of the UE1, an identifier of the OTT1", and the second processing policy indicates that the data packet sent by the UE1 to the OTT1 is to be processed. In other words, if there are corresponding identifiers in the second processing policy, the data packet needs to be processed.

S240. The capability exposure function device configures the second processing policy on the network side, where the second processing policy is used by a network side device to process the data packet.

The capability exposure function device configures the second processing policy on the network side device, such as a database of the network side, a base station, or an MEC. In this way, the base station or the MEC may process the data packet by using the second processing policy.

Optionally, in an embodiment of the present invention, the capability exposure function device sends the second processing policy to a database of the network side, where the database is used by a base station to query the second processing policy, and the second processing policy is used by the base station to process the data packet.

In this embodiment, the capability exposure function device installs the second processing policy in the database of the network side. The database may be in a newly-added network element of the network side, or in an existing network element of the network side, and the present invention sets no limitation thereto. After receiving the data packet sent by the UE to the third-party application, the base station queries the second processing policy in the database. For example, the base station sends a query request to the database, where the request includes the internal identifier of the UE and the identifier of the third-party application, and the database sends a found processing policy of the data packet to the base station. For example, the processing policy of the data packet is "yes", in other words, the data packet needs to be processed. The base station processes the data packet according to the processing policy of the data packet. For example, access network status information is added to the data packet, and then the data packet is sent to the third-party application. The access network status information includes load information and/or congestion information of an access network. The base station may add a packet header including the access network status information to the data packet, and send the data packet to the third-party application. In this way, the third-party application may perform corresponding processing based on the information. For example, after receiving the access network status information, the third-party application may perform corresponding processing, and provide a transmission control protocol (Transmission Control Protocol, TCP) server with available uplink/downlink bandwidth in a granularity of TCP flow/user/bearer. For example, when a video service is being performed, a video rate matching a network resource is set, and then the TCP server performs congestion control decision by using corresponding information. In this way, a load variation of an access network side can be adapted to in real time, thereby improving user experience.

Optionally, in another embodiment of the present invention, the capability exposure function device sends the second processing policy to a radio access network congestion awareness function device, so that the radio access network congestion awareness function device sends the second processing policy to a base station, where the second processing policy is used by the base station to process the data packet.

A difference between this embodiment and the previous one lies in that the capability exposure function device sends the second processing policy to the base station by using the radio access network congestion awareness function device, such as an RCAF, so that the second processing policy is configured on the base station.

Optionally, the method further includes:

obtaining, by the capability exposure function device, an identifier of the base station based on the external identifier of the UE; and sending, by the capability exposure function device, the identifier of the base station to the radio access network congestion awareness function device.

During transmission of the second processing policy to the base station, the capability exposure function device may not know a position of the UE, that is, may not know in which base station the UE is located. Excessive resources are consumed if information is sent to all base stations. Therefore, a UE position monitoring request may be first sent to the HSS, to obtain position information of the UE, and then the second processing policy is sent to a corresponding base station by using an RCAF.

Specifically, the monitoring request sent by the capability exposure function device to the HSS includes the external identifier of the UE. The HSS audits the request, and sends a user data insertion request to an MME/SGSN. The MME/SGSN processes the request, and searches for cell (cell)/routing area (Routing Area, RA)/tracking area (Tracking Area, TA)/eNB information corresponding to the UE. The MME/SGSN sends a user data insertion response to the HSS, where the user data insertion response includes eNB-ID/cell-ID/routing area identity (Routing Area Identity, RAI)/tracking area identity (Tracking Area Identity, TAI) information of the UE and an IP address of the UE. The HSS sends a monitoring response to the capability exposure function device, where the monitoring response includes the eNB-ID/cell-ID/RAI/TAI information of the UE and the IP address of the UE. In this way, the capability exposure function device obtains the position of the UE, that is, obtains an eNodeB in which the UE is located and the IP address of the UE. The foregoing is a monitoring event: position reporting in the protocol 23.682, and obtaining the IP address of the UE from the MME is added herein. Then, the capability exposure function device sends, to the RCAF, the second processing policy and an eNB-ID corresponding to the UE. The RCAF sends the second processing policy to the corresponding eNodeB, so that the second processing policy is configured on the base station.

When receiving the data packet sent by the UE to the third-party application, the base station queries the second processing policy in the base station based on the internal identifier of the UE and the identifier of the third-party application, to obtain the processing policy of the data packet. For example, the processing policy of the data packet is "yes", in other words, the data packet needs to be processed. The base station processes the data packet according to the processing policy of the data packet. Refer to the previous embodiment for a specific processing manner. For brevity, details are not described herein again.

Optionally, in another embodiment of the present invention, the capability exposure function device sends the second processing policy to a mobile edge computing platform, where the second processing policy is used by the mobile edge computing platform to process the data packet.

In this embodiment, the capability exposure function device installs the second processing policy on the mobile edge computing platform. When obtaining the data packet sent by the UE to the third-party application, the mobile edge computing platform queries the second processing policy in the mobile edge computing platform based on the internal identifier of the UE and the identifier of the third-party application, to obtain the processing policy of the data packet. For example, the processing policy of the data packet is "yes", in other words, the data packet needs to be processed. The mobile edge computing platform performs local routing on the data packet according to the processing policy of the data packet. In this way, the data packet may be directly routed to the third-party application, and is no longer sent to the third-party application by using a core network. Optionally, the mobile edge computing platform may further perform local processing, for example, obtain load information and radio link quality information of the access network side, feed back the load information and the radio link quality information of the access network side to a content optimization processing unit, and perform dynamic adjustment (for example, video bitrate adjustment), so that user experience can be improved, and delay and a quantity of freeze times can be reduced.

In this embodiment of the present invention, optionally, the method further includes:

obtaining, by the capability exposure function device, an updated internal identifier of the UE and the non-updated internal identifier of the UE; and updating and configuring, by the capability exposure function device, the second processing policy on the network side based on the updated internal identifier of the UE and the non-updated internal identifier of the UE.

The internal identifier of the UE may change. For example, when the UE is switched to an idle (IDLE) state and then is connected to a network again, the internal IP address of the UE changes. In this case, the second processing policy may be updated based on a non-updated internal identifier and an updated internal identifier.

For example, it is assumed that the internal IP address changes, and the capability exposure function device sends a subscription information request to the PGW, where the request includes the internal IP address of the UE. The PGW sends a subscription information response to the capability exposure function device. When a connection status of the UE is switched, the UE accesses a network again, and the internal IP address changes due to IP address re-allocation, the PGW sends an updated internal IP address and the non-updated internal IP address to the capability exposure function device by using the subscription information response. The capability exposure function device updates and configures the second processing policy on the network side. For example, the capability exposure function device sends the updated internal identifier of the UE and the non-updated internal identifier of the UE to the database; and the database updates the second processing policy in the mobile edge computing platform based on the updated internal identifier of the UE and the non-updated internal identifier of the UE. Alternatively, the capability exposure function device sends the updated internal identifier of the UE and the non-updated internal identifier of the UE to the radio access network congestion awareness function device; the radio access network congestion awareness function device sends the updated internal identifier of the UE and the non-updated internal identifier of the UE to the base station; and the base station updates the second processing policy in the base station based on the updated internal identifier of the UE and the non-updated internal identifier of the UE. Alternatively, the capability exposure function device sends the updated internal identifier of the UE and the non-updated internal identifier of the UE to the mobile edge computing platform; and the mobile edge computing platform updates the second processing policy in the mobile edge computing platform based on the updated internal identifier of the UE and the non-updated internal identifier of the UE.

According to the data packet processing method in this embodiment of the present invention, the second processing policy is configured on the network side based on the first processing policy sent by the third-party application, so that the data packet of the third-party application can be processed according to the policy, thereby improving transmission efficiency of the data packet of the third-party application.

FIG. 3 is a schematic flowchart of a data packet processing method 300 according to an embodiment of the present invention. The method 300 is executed by a network side device. As shown in FIG. 3, the method 300 includes the following steps:

S310. The network side device obtains a data packet sent by UE to a third-party application, where the data packet includes an internal identifier of the UE and an identifier of the third-party application, and the internal identifier of the UE is an identifier for identifying the UE by a network side.

S320. The network side device queries a second processing policy based on the internal identifier of the UE and the identifier of the third-party application, to obtain a processing policy of the data packet, where the second processing policy includes the internal identifier of the UE, the identifier of the third-party application, and the processing policy of the data packet; the second processing policy is obtained by a capability exposure function device based on a first processing policy of the third-party application and is configured on the network side; the first processing policy includes an external identifier of the UE, the identifier of the third-party application, and the processing policy of the data packet; and the external identifier of the UE is an identifier for identifying the UE by the third-party application.

S330. The network side device processes the data packet according to the processing policy of the data packet.

According to the data packet processing method in this embodiment of the present invention, the data packet is processed according to the configured second processing policy, so that the data packet of the third-party application can be processed according to the policy, thereby improving transmission efficiency of the data packet of the third-party application.

Optionally, in an embodiment of the present invention, the network side device is a base station; and the base station adds access network status information to the data packet according to the processing policy of the data packet, and sends the data packet to the third-party application.

Optionally, the base station queries the second processing policy in a database of the network side based on the internal identifier of the UE and the identifier of the third-party application, to obtain the processing policy of the data packet, where the second processing policy is sent by the capability exposure function device to the database.

Optionally, the method further includes:
receiving, by the base station, the second processing policy sent by a radio access network congestion awareness function device, where the second processing policy is sent by the capability exposure function device to the radio access network congestion awareness function device; and
querying, by the base station, the second processing policy in the base station based on the internal identifier of the UE and the identifier of the third-party application, to obtain the processing policy of the data packet.

Optionally, the method further includes:
receiving, by the base station, an updated internal identifier of the UE and the non-updated internal identifier of the UE that are sent by the radio access network congestion awareness function device, where the updated internal identifier of the UE and the non-updated internal identifier of the UE are sent by the capability exposure function device to the radio access network congestion awareness function device; and
updating, by the base station, the second processing policy in the base station based on the updated internal identifier of the UE and the non-updated internal identifier of the UE.

Optionally, in another embodiment of the present invention, the network side device is a mobile edge computing platform; and
the mobile edge computing platform performs local routing on the data packet according to the processing policy of the data packet.

Optionally, the method further includes:
receiving, by the mobile edge computing platform, the second processing policy sent by the capability exposure function device; and
querying, by the mobile edge computing platform, the second processing policy in the mobile edge computing platform based on the internal identifier of the UE and the identifier of the third-party application, to obtain the processing policy of the data packet.

Optionally, the method further includes:
receiving, by the mobile edge computing platform, an updated internal identifier of the UE and the non-updated internal identifier of the UE that are sent by the capability exposure function device; and
updating, by the mobile edge computing platform, the second processing policy in the mobile edge computing platform based on the updated internal identifier of the UE and the non-updated internal identifier of the UE.

Optionally, the external identifier of the UE is a public IP address, a phone number, or an account name of the UE; and the internal identifier of the UE is a internal IP address or a tunnel ID of the UE.

The following describes the embodiments of the present invention in detail with reference to specific examples. It should be noted that these examples are only intended for enabling a person skilled in the art to better understand the embodiments of the present invention, other than limiting the scope of the embodiments of the present invention.

Figure 4:
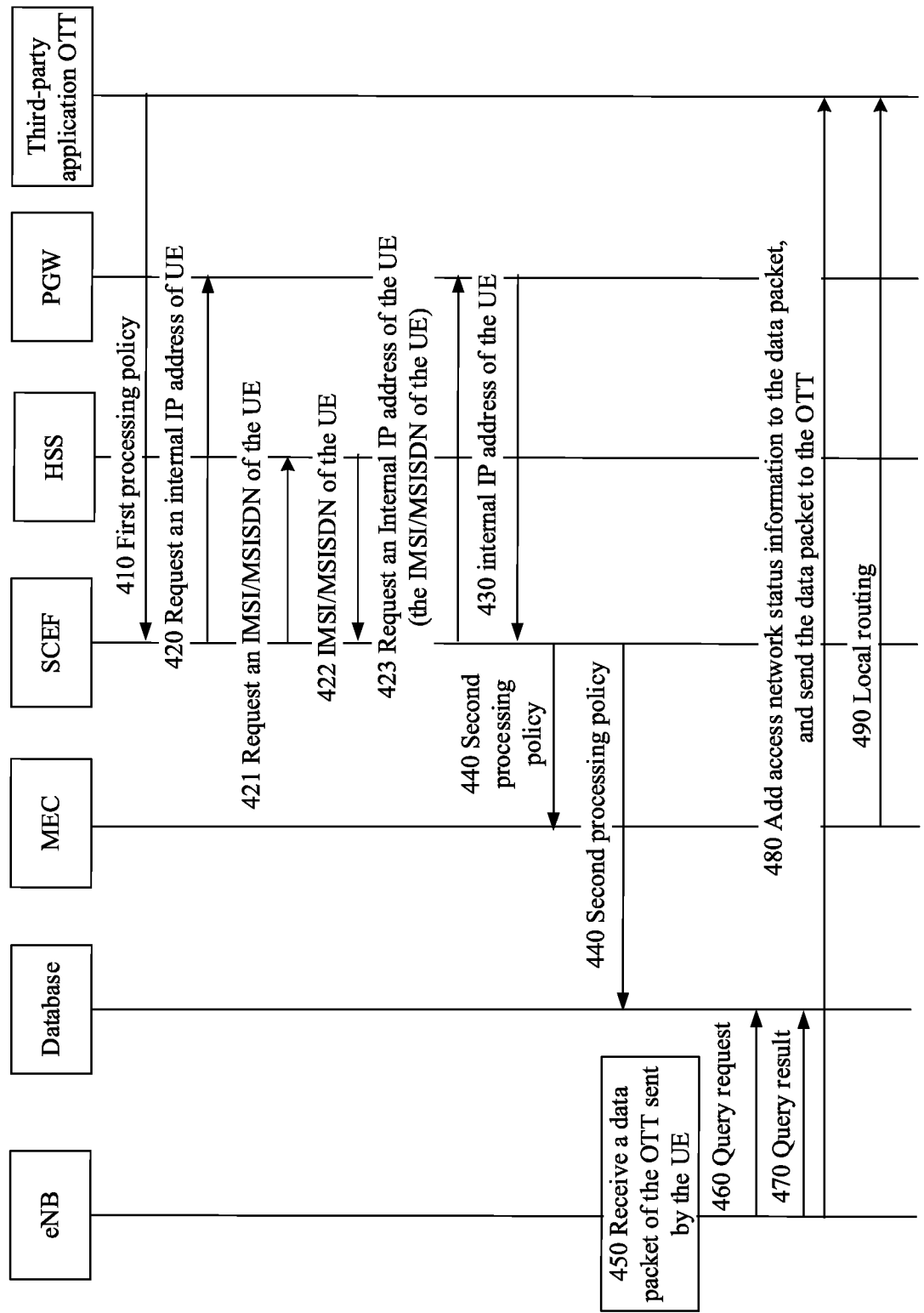
FIG. 4 is a schematic flowchart of a data packet processing method according to still another embodiment of the present invention.

FIG. 4 is a schematic flowchart of a data packet processing method according to an embodiment of the present invention.

410. An OTT sends a first processing policy to an SCEF, where the first processing policy includes an OTT identifier (such as a server IP address), an external identifier of UE, and a data packet processing policy.

420. When the external identifier of the UE in 410 is a public IP address, the SCEF sends a request to a PGW, to request a internal IP address of the UE, where the request includes the public IP address of the UE.

421. When the external identifier of the UE in 410 is another external identifier different from a public IP address of the UE, for example, is a phone number or an account name, the SCEF sends a request to an HSS, to request an IMSI/MSISDN of the UE, where the request includes the external identifier of the UE.

422. The HSS receives the external identifier of the UE, and sends the corresponding IMSI/MSISDN of the UE to the SCEF.

423. The SCEF sends a request to a PGW, to request a internal IP address of the UE, where the request includes the IMSI/MSISDN of the UE.

420 is parallel to 421 to 423.

430. The PGW sends the internal IP address of the UE to the SCEF.

440. The SCEF sends a second processing policy to an MEC.

445. The SCEF sends a second processing policy to a database.

440 is parallel to 445.

450. When the UE sends a data packet of the OTT to an eNodeB, the eNodeB receives the data packet sent by the UE.

460. The eNodeB sends a query request to the database, where the query request includes the internal IP address of the UE and the OTT identifier.

470. The database performs query by using the internal IP address of the UE and the OTT identifier that are received from the eNodeB, determines whether the UE and the OTT enjoy a data packet processing service, and sends a query result to the eNodeB.

480. If the query result is "yes", the eNodeB queries access network status information corresponding to the UE, such as congestion information, adds a packet header including the information to the data packet, and sends the data packet to the OTT.

490. The MEC obtains the data packet of the UE, queries the second processing policy, where the second processing policy includes a processing policy of the data packet, and directly routes the second processing policy to the OTT if the processing policy is "yes".

490 is parallel to 450 to 480.

Figure 5:
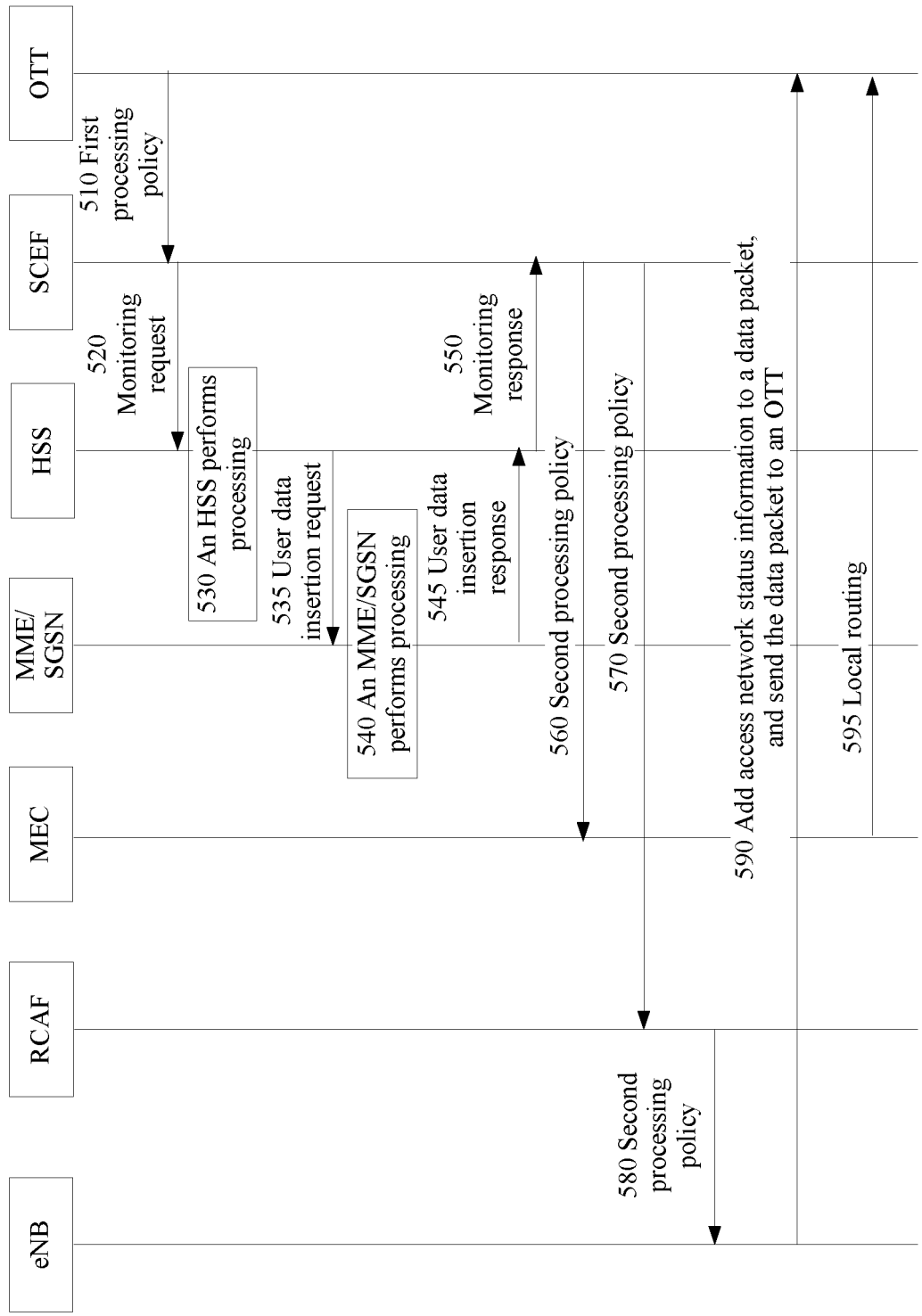
FIG. 5 is a schematic flowchart of a data packet processing method according to still another embodiment of the present invention.

FIG. 5 is a schematic flowchart of a data packet processing method according to another embodiment of the present invention.

510. An OTT sends a first processing policy to an SCEF, where the first processing policy includes an OTT identifier, an external identifier of UE, and a data packet processing policy.

520. The SCEF sends a monitoring request to an HSS, where the monitoring request includes the external identifier of the UE.

530. The HSS audits the request.

535. The HSS sends a user data insertion request to an MME/SGSN.

540. The MME/SGSN performs processing, and searches for cell/RA/TA/eNB information corresponding to the UE.

545. The MME/SGSN sends a user data insertion response to the HSS, where the user data insertion response includes eNB-ID/cell-ID/RAI/TAI information of the UE and an IP address of the UE.

550. The HSS sends a monitoring response to the SCEF, where the monitoring response includes the eNB-ID/cell-ID/RAI/TAI information of the UE and the IP address of the UE.

560. The SCEF sends a second processing policy to an MEC.

570. The SCEF sends, to an RCAF, a second processing policy and an eNB-ID corresponding to the UE.

580. The RCAF sends the second processing policy to an eNodeB.

560 is parallel to 570 and 580.

590. The eNodeB receives a data packet of the UE, queries the second processing policy, if a query result is "yes", queries access network status information corresponding to the UE, such as congestion information, adds a packet header including the information to the data packet, and sends the data packet to the OTT.

595. The MEC obtains a data packet of the UE, queries the second processing policy, and directly routes the data packet to the OTT if a query result is "yes".

590 is parallel to 595.

Figure 6:
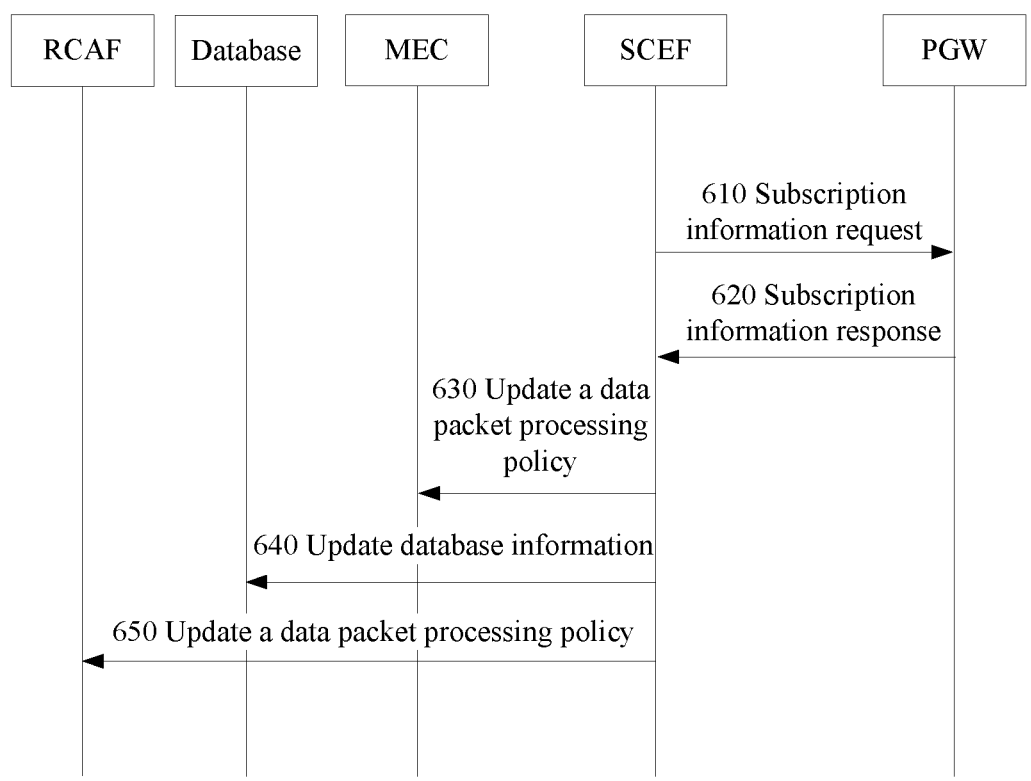
FIG. 6 is a schematic flowchart of a data packet processing method according to still another embodiment of the present invention.

FIG. 6 is a schematic flowchart of a data packet processing method according to another embodiment of the present invention. This embodiment is an example of updating and configuring a second processing policy.

610. When receiving an internal IP address of UE, an SCEF sends a subscription information request to a PGW, where the request includes the received internal IP address of the UE.

620. The PGW sends a subscription information response to the SCEF. When a connection status of the UE is switched, the UE accesses a network again, and the IP address changes due to IP address re-allocation, the PGW sends a new IP address and the previous IP address to the SCEF by using the subscription information response.

630. The SCEF sends a request of updating a data packet processing policy to the MEC, where the request includes the new IP address and the previous IP address of the UE, and the MEC updates the data packet processing policy.

640. The SCEF sends a request of updating database information to a database, where the request includes the new IP address and the previous IP address of the UE, and the database updates the data packet processing policy.

650. The SCEF sends a request of updating a data packet processing policy to an RCAF, where the request includes the new IP address of the UE and the previous IP address, then the RCAF sends the data packet processing policy to an eNodeB, and the eNodeB completes update of the data packet processing policy.

The foregoing 630, 640, 650 are parallel manners.

Figure 7:
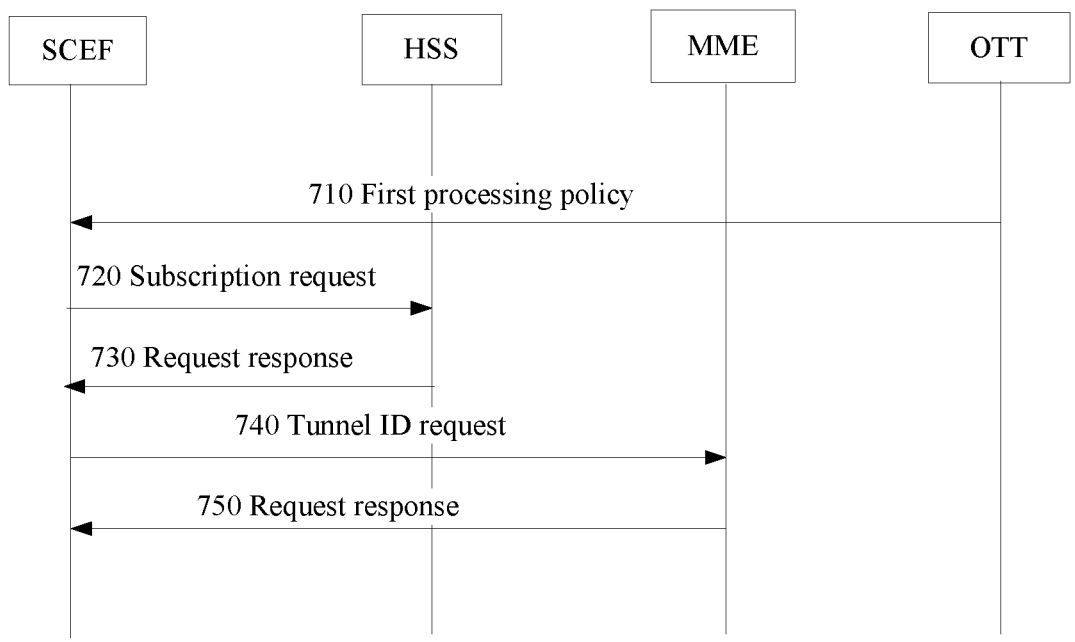
FIG. 7 is a schematic flowchart of a data packet processing method according to still another embodiment of the present invention.

FIG. 7 is a schematic flowchart of a data packet processing method according to another embodiment of the present invention.

710. An OTT sends a first processing policy to an SCEF, where the first processing policy includes an OTT identifier (such as a server IP address), an external identifier of UE, and a data packet processing policy.

720. The SCEF sends a subscription request to an HSS, where the subscription request includes the external identifier of the UE. When a connection status of the UE changes, the change is reported to the SCEF.

730. The HSS sends a request response to the SCEF, where the request response includes an IMSI/MSISDN of the UE and a destination MME address.

740. The SCEF sends a tunnel ID request message to an MME, where the tunnel ID request message includes the IMSI/MSISDN of the UE.

750. The MME sends a request response to the SCEF, where the request response includes an eNB address or an eNB TEID/SGW TEID.

Alternatively, the SCEF may request tunnel ID information from an SGW, and the SGW returns an eNB address or an eNB TEID/SGW TEID to the SCEF.

At this point, the SCEF obtains a second processing policy (the OTT identifier and the tunnel ID), and then a process of sending the second processing policy to an eNodeB, a database, and an MEC is the same as that in the foregoing embodiments.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing describes in detail the data packet processing methods according to the embodiments of the present invention, and the following describes devices in the embodiments of the present invention.

Figure 8:
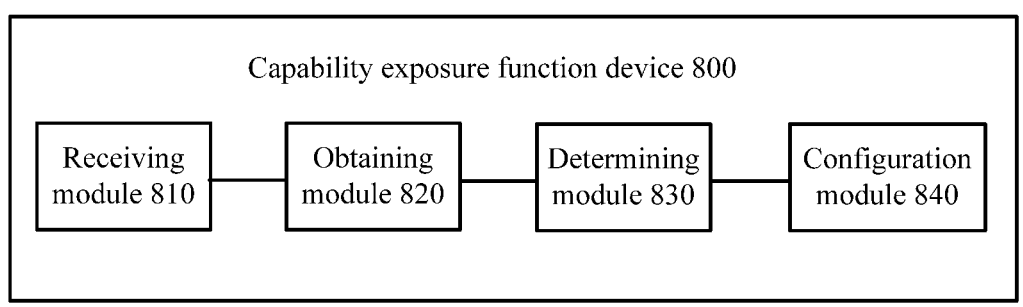
FIG. 8 is a schematic block diagram of a capability exposure function device according to an embodiment of the present invention.

FIG. 8 is a schematic block diagram of a capability exposure function device 800 according to an embodiment of the present invention. The capability exposure function device may be an SCEF, or a capability exposure function in an MEC. As shown in FIG. 8, the capability exposure function device 800 includes:

a receiving module 810, configured to receive a first processing policy sent by a third-party application, where the first processing policy includes an external identifier of user equipment UE, an identifier of the third-party application, and a processing policy of a data packet sent by the UE to the third-party application; and the external identifier of the UE is an identifier for identifying the UE by the third-party application;

an obtaining module 820, configured to obtain an internal identifier of the UE based on the external identifier of the UE, where the internal identifier of the UE is an identifier for identifying the UE by a network side;

a determining module 830, configured to determine a second processing policy based on the internal identifier of the UE, where the second processing policy includes the internal identifier of the UE, the identifier of the third-party application, and the processing policy of the data packet; and a configuration module 840, configured to configure the second processing policy on the network side, where the second processing policy is used by a network side device to process the data packet.

According to the capability exposure function device in this embodiment of the present invention, the second processing policy is configured on the network side based on the first processing policy sent by the third-party application, so that the data packet of the third-party application can be processed according to the policy, thereby improving transmission efficiency of the data packet of the third-party application.

Optionally, in an embodiment of the present invention, the configuration module 840 is specifically configured to send the second processing policy to a database of the network side, where the database is used by a base station to query the second processing policy, and the second processing policy is used by the base station to process the data packet.

Optionally, in another embodiment of the present invention, the configuration module 840 is specifically configured to send the second processing policy to a mobile edge computing platform, where the second processing policy is used by the mobile edge computing platform to process the data packet.

Optionally, in another embodiment of the present invention, the configuration module 840 is specifically configured to send the second processing policy to a radio access network congestion awareness function device, so that the radio access network congestion awareness function device sends the second processing policy to a base station, where the second processing policy is used by the base station to process the data packet.

Optionally, the obtaining module 820 is further configured to obtain an identifier of the base station based on the external identifier of the UE; and the configuration module 840 is further configured to send the identifier of the base station to the radio access network congestion awareness function device.

Optionally, in an embodiment of the present invention, the external identifier of the UE is a public Internet Protocol IP address, a phone number, or an account name of the UE; and the internal identifier of the UE is a internal IP address or a tunnel identifier tunnel ID of the UE.

Optionally, in an embodiment of the present invention, the obtaining module 820 is further configured to obtain an updated internal identifier of the UE and the non-updated internal identifier of the UE.

The configuration module 840 is further configured to update and configure the second processing policy on the network side based on the updated internal identifier of the UE and the non-updated internal identifier of the UE.

The capability exposure function device 800 according to this embodiment of the present invention may be corresponding to the capability exposure function device in the data packet processing methods in the embodiments of the present invention, and further, the foregoing and other operations and/or functions of each module of the capability exposure function device 800 are for implementing corresponding processes of the foregoing methods. For brevity, details are not described herein again.

Figure 9:
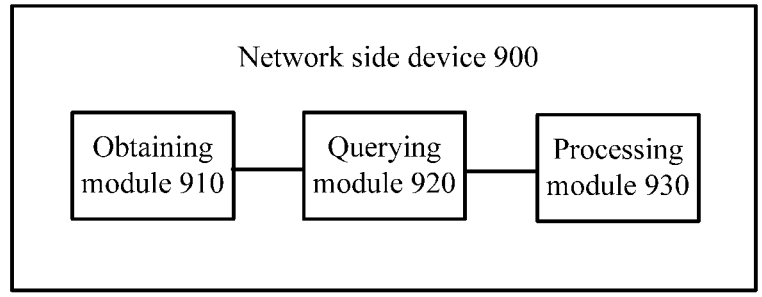
FIG. 9 is a schematic block diagram of a network side device according to an embodiment of the present invention.

FIG. 9 is a schematic block diagram of a network side device 900 according to an embodiment of the present invention. As shown in FIG. 9, the network side device 900 includes:

an obtaining module 910, configured to obtain a data packet sent by user equipment UE to a third-party application, where the data packet includes an internal identifier of the UE and an identifier of the third-party application, and the internal identifier of the UE is an identifier for identifying the UE by a network side;

a querying module 920, configured to query a second processing policy based on the internal identifier of the UE and the identifier of the third-party application, to obtain a processing policy of the data packet, where the second processing policy includes the internal identifier of the UE, the identifier of the third-party application, and the processing policy of the data packet; the second processing policy is obtained by a capability exposure function device based on a first processing policy of the third-party application and is configured on the network side; the first processing policy includes an external identifier of the UE, the identifier of the third-party application, and the processing policy of the data packet; and the external identifier of the UE is an identifier for identifying the UE by the third-party application; and a processing module 930, configured to process the data packet according to the processing policy of the data packet.

According to the network side device in this embodiment of the present invention, the data packet is processed according to the configured second processing policy, so that the data packet of the third-party application can be processed according to the policy, thereby improving transmission efficiency of the data packet of the third-party application.

Optionally, in an embodiment of the present invention, the network side device 900 is a base station; and the processing module 930 is specifically configured to add access network status information to the data packet according to the processing policy of the data packet, and send the data packet to the third-party application.

Optionally, the querying module 920 is specifically configured to query the second processing policy in a database of the network side based on the internal identifier of the UE and the identifier of the third-party application, to obtain the processing policy of the data packet, where the second processing policy is sent by the capability exposure function device to the database.

Optionally, the obtaining module 910 is further configured to receive the second processing policy sent by a radio access network congestion awareness function device, where the second processing policy is sent by the capability exposure function device to the radio access network congestion awareness function device.

The querying module 920 is specifically configured to query the second processing policy in the base station based on the internal identifier of the UE and the identifier of the third-party application, to obtain the processing policy of the data packet.

Optionally, the obtaining module 910 is further configured to receive an updated internal identifier of the UE and the non-updated internal identifier of the UE that are sent by the radio access network congestion awareness function device, where the updated internal identifier of the UE and the non-updated internal identifier of the UE are sent by the capability exposure function device to the radio access network congestion awareness function device; and update the second processing policy in the base station based on the updated internal identifier of the UE and the non-updated internal identifier of the UE.

Optionally, in another embodiment of the present invention, the network side device 900 is a mobile edge computing platform; and the processing module 930 is specifically configured to perform local routing on the data packet according to the processing policy of the data packet.

Optionally, the obtaining module 910 is further configured to receive the second processing policy sent by the capability exposure function device; and the querying module 920 is specifically configured to query the second processing policy in the mobile edge computing platform based on the internal identifier of the UE and the identifier of the third-party application, to obtain the processing policy of the data packet.

Optionally, the obtaining module 910 is further configured to receive an updated internal identifier of the UE and the non-updated internal identifier of the UE that are sent by the capability exposure function device; and update the second processing policy in the mobile edge computing platform based on the updated internal identifier of the UE and the non-updated internal identifier of the UE.

Optionally, the external identifier of the UE is a public Internet Protocol IP address, a phone number, or an account name of the UE; and the internal identifier of the UE is a internal IP address or a tunnel identifier tunnel ID of the UE.

The network side device 900 according to this embodiment of the present invention may be corresponding to the base station or the mobile edge computing platform in the data packet processing methods in the embodiments of the present invention, and further, the foregoing and other operations and/or functions of each module of the network side device 900 are for implementing corresponding processes of the foregoing methods. For brevity, details are not described herein again.

Figure 10:
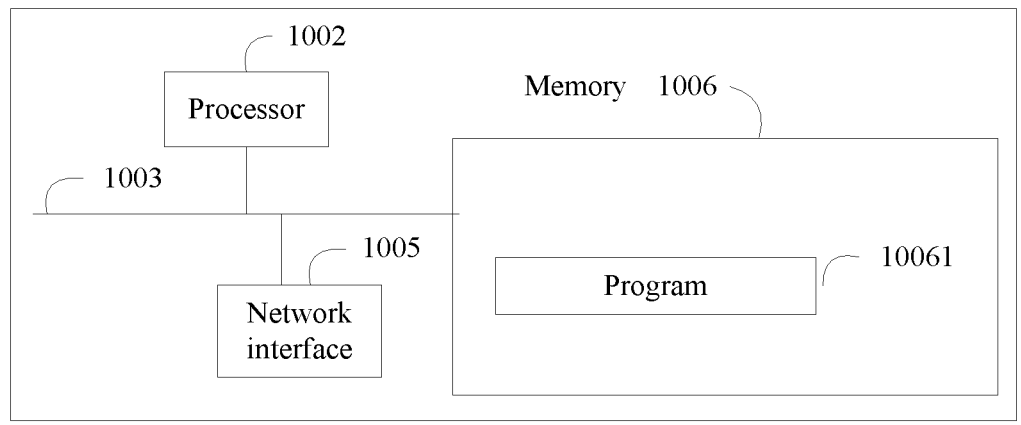
FIG. 10 is a schematic structural diagram of a capability exposure function device according to an embodiment of the present invention.

FIG. 10 shows a structure of a capability exposure function device according to still another embodiment of the present invention. The capability exposure function device includes at least one processor 1002 (such as a CPU), at least one network interface 1005 or another communications interface, a memory 1006, and at least one communications bus 1003, configured to implement connection and communication between these apparatuses. The processor 1002 is configured to execute an executable module, such as a computer program, stored in the memory 1006. The memory 1006 may include a high-speed random access memory (RAM, Random Access Memory), and may further include a non-volatile memory (non-volatile memory), for example, at least one magnetic disk memory. A communication connection between the capability exposure function device and at least one another network element may be implemented by using the at least one network interface 1005 (which may be wired or wireless).

In some implementations, the memory 1006 stores a program 10061, and the processor 1002 executes the program 10061, and is configured to execute the methods in the foregoing embodiments of the present invention.

Figure 11:
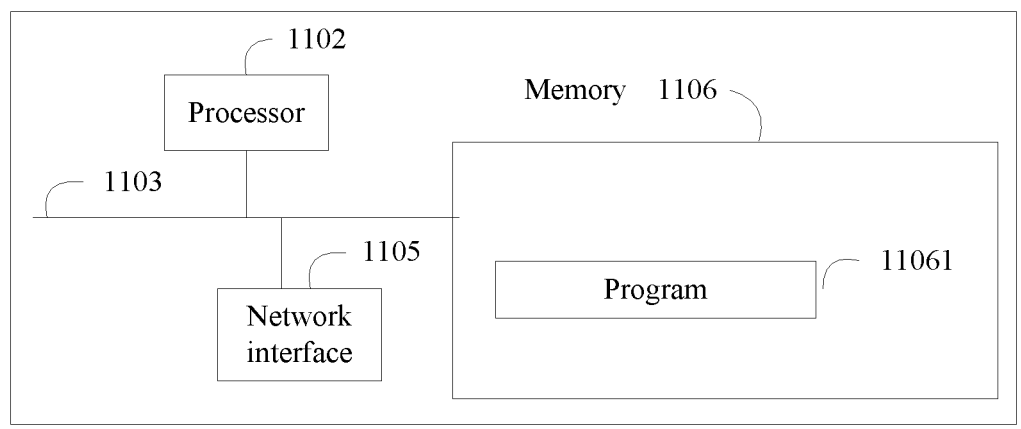
FIG. 11 is a schematic structural diagram of a network side device according to an embodiment of the present invention.

FIG. 11 shows a structure of a network side device according to still another embodiment of the present invention. The network side device includes at least one processor 1102 (such as a CPU), at least one network interface 1105 or another communications interface, a memory 1106, and at least one communications bus 1103, configured to implement connection and communication between these apparatuses. The processor 1102 is configured to execute an executable module, such as a computer program, stored in the memory 1106. The memory 1106 may include a high-speed random access memory (RAM, Random Access Memory), and may further include a non-volatile memory (non-volatile memory), for example, at least one magnetic disk memory. A communication connection between the network side device and at least one another network element may be implemented by using the at least one network interface 1105 (which may be wired or wireless).

In some implementations, the memory 1106 stores a program 11061, and the processor 1102 executes the program 11061, and is configured to execute the methods in the foregoing embodiments of the present invention.

It should be understood that the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual requirements to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data packet processing method, comprising:
receiving, by a capability exposure function device, a first processing policy sent by a third-party application, wherein the first processing policy comprises an external identifier of user equipment UE, an identifier of the third-party application, and a processing policy of a data packet sent by the UE to the third-party application; and the external identifier of the UE is an identifier for identifying the UE by the third-party application;
obtaining, by the capability exposure function device, an internal identifier of the UE based on the external identifier of the UE, wherein the internal identifier of the UE is an identifier for identifying the UE by a network side;
determining, by the capability exposure function device, a second processing policy based on the internal identifier of the UE, wherein the second processing policy comprises the internal identifier of the UE, the identifier of the third-party application, and the processing policy of the data packet; and
configuring, by the capability exposure function device, the second processing policy on the network side, wherein the second processing policy is used by a network side device to process the data packet.

2. A data packet processing method, comprising:
obtaining, by a network side device, a data packet sent by user equipment UE to a third-party application, wherein the data packet comprises an internal identifier of the UE and an identifier of the third-party application, and the internal identifier of the UE is an identifier for identifying the UE by a network side;
querying, by the network side device, a second processing policy based on the internal identifier of the UE and the identifier of the third-party application, to obtain a processing policy of the data packet, wherein the second processing policy comprises the internal identifier of the UE, the identifier of the third-party application, and the processing policy of the data packet; the second processing policy is obtained by a capability exposure function device based on a first processing policy of the third-party application and is configured on the network side; the first processing policy comprises an external identifier of the UE, the identifier of the third-party application, and the processing policy of the data packet; and the external identifier of the UE is an identifier for identifying the UE by the third-party application; and
processing, by the network side device, the data packet according to the processing policy of the data packet.

3. The method according to claim 2, wherein the network side device is a base station; and
the processing, by the network side device, the data packet according to the processing policy of the data packet comprises:
adding, by the base station, access network status information to the data packet according to the processing policy of the data packet, and sending the data packet to the third-party application.

4. The method according to claim 3, wherein the querying, by the network side device, a second processing policy based on the internal identifier of the UE and the identifier of the third-party application, to obtain a processing policy of the data packet comprises:
querying, by the base station, the second processing policy in a database of the network side based on the internal identifier of the UE and the identifier of the third-party application, to obtain the processing policy of the data packet, wherein the second processing policy is sent by the capability exposure function device to the database.

5. The method according to claim 3, wherein the method further comprises:
receiving, by the base station, the second processing policy sent by a radio access network congestion awareness function device, wherein the second processing policy is sent by the capability exposure function device to the radio access network congestion awareness function device; and the querying, by the network side device, a second processing policy based on the internal identifier of the UE and the identifier of the third-party application, to obtain a processing policy of the data packet comprises:

querying, by the base station, the second processing policy in the base station based on the internal identifier of the UE and the identifier of the third-party application, to obtain the processing policy of the data packet.

6. The method according to claim 5, wherein the method further comprises:

receiving, by the base station, an updated internal identifier of the UE and the non-updated internal identifier of the UE that are sent by the radio access network congestion awareness function device, wherein the updated internal identifier of the UE and the non-updated internal identifier of the UE are sent by the capability exposure function device to the radio access network congestion awareness function device; and updating, by the base station, the second processing policy in the base station based on the updated internal identifier of the UE and the non-updated internal identifier of the UE.

7. The method according to claim 2, wherein the network side device is a mobile edge computing platform; and the processing, by the network side device, the data packet according to the processing policy of the data packet comprises:

performing, by the mobile edge computing platform, local routing on the data packet according to the processing policy of the data packet.

8. The method according to claim 7, wherein the method further comprises:

receiving, by the mobile edge computing platform, the second processing policy sent by the capability exposure function device; and the querying, by the network side device, a second processing policy based on the internal identifier of the UE and the identifier of the third-party application, to obtain a processing policy of the data packet comprises:

querying, by the mobile edge computing platform, the second processing policy in the mobile edge computing platform based on the internal identifier of the UE and the identifier of the third-party application, to obtain the processing policy of the data packet.

9. The method according to claim 8, wherein the method further comprises:

receiving, by the mobile edge computing platform, an updated internal identifier of the UE and the non-updated internal identifier of the UE that are sent by the capability exposure function device; and updating, by the mobile edge computing platform, the second processing policy in the mobile edge computing platform based on the updated internal identifier of the UE and the non-updated internal identifier of the UE.

10. The method according to claim 2, wherein the external identifier of the UE is a public Internet Protocol IP address, a phone number, or an account name of the UE; and the internal identifier of the UE is a internal IP address or a tunnel identifier tunnel ID of the UE.

11. A capability exposure function device, comprising:

a receiving module, configured to receive a first processing policy sent by a third-party application, wherein the first processing policy comprises an external identifier of user equipment UE, an identifier of the third-party application, and a processing policy of a data packet sent by the UE to the third-party application; and the external identifier of the UE is an identifier for identifying the UE by the third-party application;

an obtaining module, configured to obtain an internal identifier of the UE based on the external identifier of the UE, wherein the internal identifier of the UE is an identifier for identifying the UE by a network side;

a determining module, configured to determine a second processing policy based on the internal identifier of the UE, wherein the second processing policy comprises the internal identifier of the UE, the identifier of the third-party application, and the processing policy of the data packet; and a configuration module, configured to configure the second processing policy on the network side, wherein the second processing policy is used by a network side device to process the data packet.

12. A network side device, comprising:

an obtaining module, configured to obtain a data packet sent by user equipment UE to a third-party application, wherein the data packet comprises an internal identifier of the UE and an identifier of the third-party application, and the internal identifier of the UE is an identifier for identifying the UE by a network side;

a querying module, configured to query a second processing policy based on the internal identifier of the UE and the identifier of the third-party application, to obtain a processing policy of the data packet, wherein the second processing policy comprises the internal identifier of the UE, the identifier of the third-party application, and the processing policy of the data packet; the second processing policy is obtained by a capability exposure function device based on a first processing policy of the third-party application and is configured on the network side; the first processing policy comprises an external identifier of the UE, the identifier of the third-party application, and the processing policy of the data packet; and the external identifier of the UE is an identifier for identifying the UE by the third-party application; and a processing module, configured to process the data packet according to the processing policy of the data packet.

13. The network side device according to claim 12, wherein the network side device is a base station; and the processing module is specifically configured to add access network status information to the data packet according to the processing policy of the data packet, and send the data packet to the third-party application.

14. The network side device according to claim 13, wherein the querying module is specifically configured to query the second processing policy in a database of the network side based on the internal identifier of the UE and the identifier of the third-party application, to obtain the processing policy of the data packet, wherein the second processing policy is sent by the capability exposure function device to the database.

15. The network side device according to claim 13, wherein the obtaining module is further configured to receive the second processing policy sent by a radio access network congestion awareness function device, and the second processing policy is sent by the capability exposure function device to the radio access network congestion awareness function device; and the querying module is specifically configured to query the second processing policy in the base station based on the internal identifier of the UE and the identifier of the third-party application, to obtain the processing policy of the data packet.

16. The network side device according to claim 15, wherein the obtaining module is further configured to receive an updated internal identifier of the UE and the non-updated internal identifier of the UE that are sent by the radio access network congestion awareness function device, wherein the updated internal identifier of the UE and the non-updated internal identifier of the UE are sent by the capability exposure function device to the radio access network congestion awareness function device; and update the second processing policy in the base station based on the updated internal identifier of the UE and the non-updated internal identifier of the UE.

17. The network side device according to claim 12, wherein the network side device is a mobile edge computing platform; and
the processing module is specifically configured to perform local routing on the data packet according to the processing policy of the data packet.

18. The network side device according to claim 17, wherein the obtaining module is further configured to receive the second processing policy sent by the capability exposure function device; and
the querying module is specifically configured to query the second processing policy in the mobile edge computing platform based on the internal identifier of the UE and the identifier of the third-party application, to obtain the processing policy of the data packet.

19. The network side device according to claim 18, wherein the obtaining module is further configured to receive an updated internal identifier of the UE and the non-updated internal identifier of the UE that are sent by the capability exposure function device; and update the second processing policy in the mobile edge computing platform based on the updated internal identifier of the UE and the non-updated internal identifier of the UE.

20. The network side device according to claim 12, wherein the external identifier of the UE is a public Internet Protocol IP address, a phone number, or an account name of the UE; and the internal identifier of the UE is a internal IP address or a tunnel identifier tunnel ID of the UE.

* * * * *